June 12, 1956 M. M. SINGER 2,750,126

DEVICE FOR PULLING CELLOPHANE ADHESIVE TAPE

Filed May 21, 1952

INVENTOR
MORTON M. SINGER
BY Samuel Stree
ATTORNEY

United States Patent Office 2,750,126

Patented June 12, 1956

2,750,126

DEVICE FOR PULLING CELLOPHANE ADHESIVE TAPE

Morton M. Singer, New York, N. Y.

Application May 21, 1952, Serial No. 289,224

2 Claims. (Cl. 242—55.5)

This invention relates to a device for handling cellophane tape.

It is the principal object of this invention to provide a device for handling cellophane adhesive tape to prevent the fingers from contacting the adhesive surface thereof. This device is a plate to which the cellophane tape may be removably attached. Its dimensions and shape are such as to expand laterally outwardly from the side edges of the cellophane tape so that it may be gripped by the fingers without at the same time gripping the tape. When this device is used in accordance with the principles of this invention, it is applied to the adhesive side of the tape at the free end of said tape which feeds off the tape roll. The tape is then taken in the hand with one finger in engagement with the non-adhesive side of the tape and the other finger in engagement with the device herein claimed. The tape may now be drawn off the roll to the extent desired without smudging its adhesive side. The tape may now be cut from the roll by any conventional means and method and it may then be applied to any suitable surface. The tape is still held as above described, that is, with one finger on its non-adhesive side and with another finger on the device herein claimed. It is the opposite newly cut end which is first applied to the suitable surface and the rest of the tape is then pressed down upon said surface until the claimed device on the first end of the tape is reached. The tape is then peeled off said device by simply holding the edges of the device and pulling it off the tape. The first mentioned end of the tape may then be pressed down upon the surface and the claimed device may be run back and forth across the non-adhesive side of the tape to smooth it down properly for full adhesion throughout its entire area with the surface to which it is applied. The entire job of removing the tape from its roll and applying it to a suitable surface is now complete without any contact whatsoever between the fingers of the person handling the tape and the adhesive side thereof.

Another object of this invention is the provision of a cellophane tape handling device of the character described which is removably attachable to a conventional cellophane tape holder of the kind which carries a small roll of cellophane tape and is provided with a serrated cutting ledge, said ledge being adapted to hold the free end of the tape prior to its removal from the roll. The claimed device is keyed to this type of cellophane roll holder and it may be set into said holder between the ledge and the roll of tape or on the ledge itself so as to detachably secure said device to the holder. It is attached to the tape at the same time that it is secured to or resting in or on the tape holder so that there is no danger of its falling off the holder and being lost. Furthermore, since it is always in engagement with the tape, it is always ready for use.

Preferred forms of this invention are shown in the accompanying drawing in which.

Figure 1:
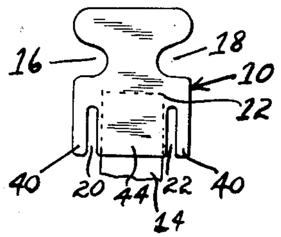
Fig. 1 is a plan view of a device for handling cellophane tape, said device being made in accordance with one form of this invention.
Figure 2:
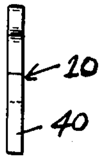
Fig. 2 is a side edge view thereof.

Referring now to Fig. 1, it will be seen that the claimed device 10 which is made in accordance with the first form of this invention comprises a flat plate 12 which is wider than the cellophane adhesive tape 14. This flat plate 12 may be stamped from sheet plastics or it may be molded of plastics or it may be stamped out of sheet metal, depending upon the individual preferences of the manufacturer. It is substantially rectangular in shape but its corners are rounded off and there may be two indentations 16 and 18 respectively formed in the sides of said plate and a pair of longitudinally extending slots 20 and 22 formed in parallel relation to each other at the lower end of said plate.

Figure 6:
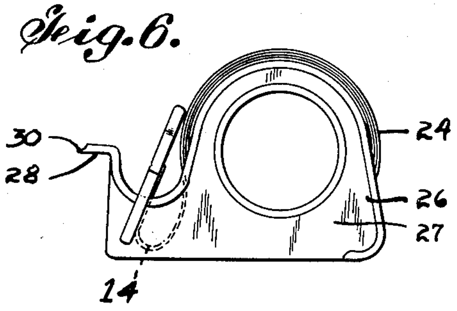
Fig. 6 shows how the device of Fig. 1 is detachably secured to the free end of cellophane adhesive tape mounted on a roll, said roll being shown supported by a holder and said device being shown mounted on said holder.
Figure 7:
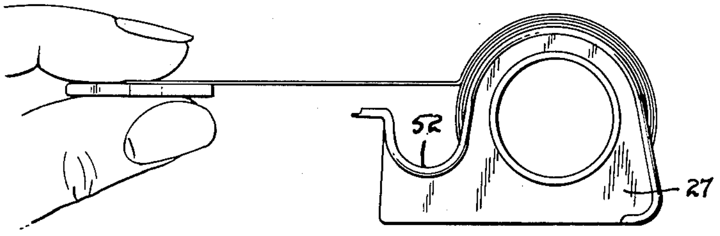
Fig. 7 shows how said device is used to draw the tape off the roll.

Since the plate is wider than the cellophane tape, it is clear that its marginal side edges may be free from the tape when the tape is secured thereto so as to render it possible to remove said plate from the tape without touching the adhesive side thereof. It will be noted in Fig. 6 that a roll 24 of cellophane adhesive tape 14 mounted in a conventional holder 26. The roll is mounted between the two side walls 27 of said holder and the tape feeds in the direction of a ledge 28 which has a serrated cutting edge 30. The slots 20 and 22 of plate 12 are adapted to receive the side walls of said holder 26 in the manner shown in Fig. 6. It is in this manner that the plate may be mounted on the holder without danger that it might fall off. It will of course be noted that the adhesive side of the free end of the cellophane tape is detachably secured to plate 12 at the same time that said plate is in engagement with the side walls of holder 26. This combination of features tends to prevent accidental displacement of said plate relative to the holder and relative to the tape mounted thereon.

Figure 5:
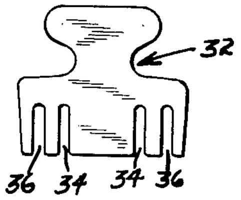
Fig. 5 is a plan view of a device of the character described made in accordance with a fourth form of this invention.

It will be understood that tape 14 and holder 26 come in different sizes and more particularly in different widths. In order to make device 10 universal in its application to these various holders and sizes of cellophane tape, it is necessary to provide the features shown in Fig. 5. It will there be seen that a device 32 made in accordance with a second form of this invention is provided with two pairs of slots 34 and 36 instead of the single pair of slots 20 and 22 shown in Fig. 1. Slots 34 correspond to slots 20 and 22 and they are adapted to accommodate the side walls of holder 26 in precisely the same manner as slots 20 and 22 accommodate said side walls. Where a wider holder is provided for wider tape, slots 36 will accommodate the side walls thereof in the same manner as slots 34 accommodate the side walls of holder 26. The rest of device 32 corresponds to device 10 in that it is made of flat stock and is wider than the narrowest cellophane tape to which it may be applied.

Figure 3:
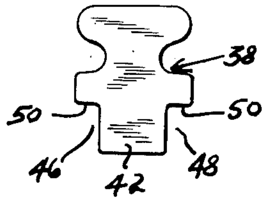
Fig. 3 is a plan view of a device of the character described made in accordance with a second form of this invention.

Referring to Fig. 3 it will be seen that a device 38 made in accordance with another form of this invention closely resembles device 10 except for the fact that it does not have legs corresponding to legs 40 of device 10. It does, however, have what may be described as a centrally extending tongue 42 which corresponds to tongue 44 of device 10. More specifically, slots 20 and 22 are formed between legs 40 and tongue 44 of plate 12. Since there are no legs in device 38 there can be no slots. But to take the place of said slots are indentations 46 and 48 respectively which flank tongue 42 in the same manner that slots 20 and 22 flank tongue 44. Tongue 42 projects into the space between the side walls of holder 26 and shoulders 50 rest on beads 52 of said side walls between roll 24 and ledge 28. In other respects device 38 is similar to device 10 and it may be made of the same materials.

Figure 4:
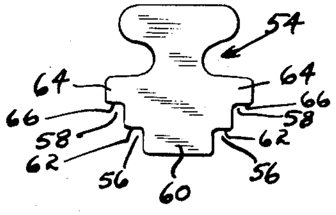
Fig. 4 is a view of a device of the character described made in accordance with a third form of this invention.

Turning now to device 54 shown in Fig. 4 it will be seen that it is similar to device 38 except that it has a pair of stepped or offset indentations 56 and 58 on each side thereof. There is a tongue 60 which projects downwardly between indentations 56 and it will be noted that said tongue widens out above said indentations to form shoulders 62. Wings 64 are formed above indentations 58 to provide shoulders 66. This device may be used in the same manner as device 38. Tongue 60 will project into the space between the walls of holder 26 and shoulders 62 will rest on the beads 52 of said walls. When a wider holder is provided, the entire tongue 60 including its wide upper portion will project into the space between the walls of said holder. Shoulders 66 will now rest on the beads which correspond to beads 52 of the side walls of holder 26. This, then, is a universal device which is applicable to cellophane tape holders of different sizes.

Figure 8:
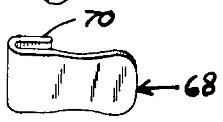
Fig. 8 is a perspective view of a device of the character described made in accordance with a fifth form of this invention.
Figure 9:
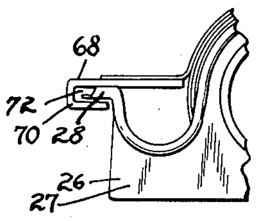
Fig. 9 is a side fragmentary view showing how the device of Fig. 8 is detachably secured to the cellophane tape and also showing how it is detachably secured to the holder on which the roll on said tape is mounted.

Fig. 8 shows a device 68 which has a curved portion 70 connected thereto along one end thereof. This curved portion forms a recess 72 between it and the main body of device 68. This recess is adapted to accommodate ledge 28 of holder 26 in the manner shown in Fig. 9. There may be a certain amount of spring tension between the main body of device 68 and its offset portion 70 on the one hand and ledge 28 on holder 26 on the other hand.

This tension would tend to hold said device in place on said ledge when the device is not in use.

Device 68 may be made of the same materials as devices 10, 32, 38 and 54. It may be stamped and bent to shape or it may be made in any other conventional way.

The foregoing is illustrative of preferred forms of this invention. It will be understood that other forms may be provided and these forms may be modified within the broad spirit of the invention and the broad scope of the claims.

I claim:

1. A device for pulling cellophane adhesive tape mounted in a roll on a holder having a pair of spaced side walls between which the roll is mounted and a ledge at the front of and between said side walls to receive and hold the free end of said tape, said device comprising a flat plate which is made of material to which the adhesive side of the tape is removably attachable, said plate having a tongue which projects downwardly into the space between said side walls of the holder, said tongue being stepped along its side edges, the lower portion being relatively narrow and the upper portion being relatively wide to fit into the space between the side walls of holders of different sizes, and offset shoulders provided at each side edge of said stepped tongue to rest on the side walls of said holders of different sizes.

2. A plate for adhesively engaging cellophane adhesive tape to pull it from a reel mounted on a holder having a pair of spaced, parallel side walls, said plate being flat and having a flat front side and a flat back side which occupy parallel planes and a pair of oppositely disposed, narrow side edges having stepped, laterally extending shoulders formed thereon on both sides of said plate for engaging the upper edges of said side walls to support the plate thereon and being thereby applicable to cellophane adhesive tape holders of different sizes, said plate being made of material to which the adhesive side of the cellophane adhesive tape is readily attachable and readily removable.

References Cited in the file of this patent

UNITED STATES PATENTS

| | | |
|---|---|---|
| 1,184,561 | Napoletano | May 23, 1916 |
| 2,366,675 | Petty | Jan. 2, 1945 |
| 2,519,701 | Richardson | Aug. 22, 1950 |
| 2,545,500 | Stanley et al. | Mar. 20, 1951 |